(12) United States Patent  
Yoon et al.

(10) Patent No.: US 9,136,915 B2
(45) Date of Patent: Sep. 15, 2015

(54) WIRELESS COMMUNICATION DEVICE

(71) Applicant: Samsung Electronics Co., Ltd., Suwon-Si (KR)

(72) Inventors: Chol-Su Yoon, Yongin-Si (KR); Sang-Hyo Lee, Seoul (KR); Hang-Seok Choi, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 170 days.

(21) Appl. No.: 13/800,855

(22) Filed: Mar. 13, 2013

(65) Prior Publication Data

US 2013/0324058 A1    Dec. 5, 2013

(30) Foreign Application Priority Data

May 31, 2012    (KR) .................. 10-2012-0058178

(51) Int. Cl.
*H04B 5/00* (2006.01)
*H04B 5/02* (2006.01)

(52) U.S. Cl.
CPC ............. *H04B 5/02* (2013.01); *H04B 5/0062* (2013.01)

(58) Field of Classification Search
CPC ................. H04B 5/0062; H04B 5/02
USPC ........................................... 455/41.1
See application file for complete search history.

(56) References Cited

U.S. PATENT DOCUMENTS

| | | | |
|---|---|---|---|
| 7,783,254 B2 | 8/2010 | Raggam et al. | |
| 7,844,238 B2 * | 11/2010 | Sherrets | 455/230 |
| 2006/0049918 A1 * | 3/2006 | Takiguchi | 340/10.4 |
| 2006/0252370 A1 * | 11/2006 | Goossens et al. | 455/41.1 |
| 2009/0286476 A1 * | 11/2009 | Toncich et al. | 455/41.1 |
| 2010/0184371 A1 * | 7/2010 | Cook et al. | 455/41.1 |
| 2010/0248653 A1 | 9/2010 | Merlin | |
| 2010/0321128 A1 | 12/2010 | Merlin | |
| 2011/0043429 A1 | 2/2011 | Merlin | |
| 2011/0111695 A1 * | 5/2011 | Shameli et al. | 455/41.1 |
| 2013/0084802 A1 * | 4/2013 | Clarke | 455/41.1 |

* cited by examiner

Primary Examiner — David Bilodeau
(74) Attorney, Agent, or Firm — F. Chau & Associates, LLC

(57) ABSTRACT

A wireless communication device includes an antenna, a transceiver, a filter circuit and an attenuation circuit. The transceiver includes a transmission electrode and a receive electrode, and communicates with an external device through the antenna. The filter circuit is coupled between the transmission electrode and the antenna, and includes a harmonic trap circuit that eliminates a harmonic element of a carrier frequency of an outgoing signal provided from the transceiver through the transmission electrode. The attenuation circuit is coupled between the receive electrode and the antenna, and provides an incoming signal received through the antenna to the receive electrode after reducing a voltage of the incoming signal.

20 Claims, 6 Drawing Sheets

WIRELESS COMMUNICATION DEVICE

CROSS-REFERENCE TO RELATED APPLICATION

This application claims under 35 USC §119 priority to and the benefit of Korean Patent Application No. 10-2012-0058178, filed on May 31, 2012 in the Korean Intellectual Property Office (KIPO), the entire contents of which are incorporated by reference herein.

BACKGROUND

1. Technical Field

The present disclosure relates to a wireless communication device, and, more particularly, to a wireless communication device that enhances transmitting and receiving performance in a near-field communication (NFC) apparatus, and a mobile apparatus including the wireless communication device.

2. Discussion of the Related Art

Recently, a mobile apparatus, such as a smart phone having a near-field communication (NFC) function, is being widely used.

NFC technology has been developed by a NFC forum. According to NFC technology, data are transferred using a contactless interface between NFC apparatuses. NFC has an active mode (that is, a reader mode) and a passive mode (that is, a card mode).

In the active mode, an NFC apparatus operates like a radio frequency identification (RFID) reader that writes data in a RFID tag and reads data from the RFID tag. For example, in the active mode, the NFC apparatus emits a magnetic field, transmits data by modulating the amplitude of the magnetic field, and receives data by an inverse modulation.

In the passive mode, the NFC apparatus operates like an RFID tag. For example, in the passive mode, the NFC apparatus does not emit a magnetic field, but receives data by modulating the amplitude of a magnetic field emitted by an external reader and transmits data by an inverse modulation.

When transmitting data, the NFC apparatus typically generates a carrier signal using a digital amplifier. Therefore, harmonics may be generated together with the carrier signal. If the harmonics are not filtered out, transmitting performance may be degraded.

In addition, since the NFC apparatus receives data using a magnetic field generated by the NFC apparatus in the active mode and receives data using a magnetic field generated by an external reader in the passive mode, intensities of received signals in the active mode and the passive mode are different from each other.

Therefore, a need exists for an NFC apparatus that eliminates unwanted transmit harmonics while correctly receiving data provided by signals of different intensities.

SUMMARY

Exemplary embodiments of the present inventive concept are directed to a wireless communication device that effectively reduces harmonics of a carrier signal.

Exemplary embodiments are further directed to a wireless communication device that effectively receives data both in an active mode and a passive mode.

Exemplary embodiments are also directed to a mobile apparatus that includes the wireless communication device.

According to an exemplary embodiment, a wireless communication device includes an antenna, a transceiver, a filter circuit and an attenuation circuit. The antenna has inductance. The transceiver includes a transmission electrode and a receive electrode, and communicates with an external device through the antenna. The filter circuit is coupled between the transmission electrode and the antenna, and includes a harmonic trap circuit that eliminates a harmonic element of a carrier frequency of an outgoing signal provided from the transceiver through the transmission electrode. The attenuation circuit is coupled between the receive electrode and the antenna, and provides an incoming signal received through the antenna to the receive electrode after reducing a voltage of the incoming signal.

The harmonic trap circuit may include an inductor and a capacitor coupled in parallel with each other.

The filter circuit may include a plurality of harmonic trap circuits coupled in series with each other, wherein each of the plurality of harmonic trap circuits eliminates respective harmonic element of the carrier frequency of the outgoing signal.

The filter circuit may further include a first capacitor coupled between the transmission electrode and the harmonic trap circuit.

The filter circuit may further include a second capacitor coupled between a node at which the harmonic trap circuit and the antenna are coupled and a ground voltage.

The transceiver may include a class D amplifier or a class E amplifier that generates the outgoing signal.

The carrier frequency may be 13.56 MHz, the filter circuit including a first harmonic trap circuit and a second harmonic trap circuit coupled in series with the first harmonic trap circuit.

The first harmonic trap circuit may eliminate a second harmonic element having a frequency of 27.12 MHz, and the second harmonic trap circuit may eliminate a third harmonic element having a frequency of 40.68 MHz.

The transceiver may include a differential amplifier that generates the outgoing signal and outputs the outgoing signal through a first transmission electrode and a second transmission electrode. The filter circuit may include a positive filter circuit coupled between the first transmission electrode and a first electrode of the antenna and including a first harmonic trap circuit that eliminates the harmonic element. A negative filter circuit may be coupled between the second transmission electrode and a second electrode of the antenna and may include a second harmonic trap circuit that eliminates the harmonic element.

The positive filter circuit may further include a first capacitor coupled between the first transmission electrode and the first harmonic trap circuit and a second capacitor coupled between a first node at which the first harmonic trap circuit and the first electrode of the antenna are coupled and a ground voltage. The negative filter circuit may further include a third capacitor coupled between the second transmission electrode and the second harmonic trap circuit and a fourth capacitor coupled between a second node at which the second harmonic trap circuit and the second electrode of the antenna are coupled and the ground voltage.

According to an exemplary embodiment, a wireless communication device includes an antenna, a transceiver, a filter circuit and an attenuation circuit. The antenna has inductance. The transceiver includes a transmission electrode, a first receive electrode and a second receive electrode, and communicates with an external device through the antenna. The filter circuit is coupled between the transmission electrode and the antenna, and filters an outgoing signal provided from the transceiver through the transmission electrode and provides the filtered outgoing signal to the antenna. The attenuation circuit is coupled between the first receive electrode, the second receive electrode and the antenna. The attenuation circuit provides an incoming signal received through the antenna to the first receive electrode after reducing a voltage of the incoming signal by an amount of a first voltage in an active mode and provides the incoming signal to the second receive electrode after reducing the voltage of the incoming signal by an amount of a second voltage, which is smaller than the first voltage, in a passive mode.

The attenuation circuit may provide a first resistance between the antenna and the first receive electrode and provide a second resistance, which is smaller than the first resistance, between the antenna and the second receive electrode.

The attenuation circuit may include a resistor unit providing a first resistance between a first node and the first receive electrode and providing a second resistance, which is smaller than the first resistance, between the first node and the second receive electrode.

The resistor unit may include a first resistor coupled between the first node and the first receive electrode and having the first resistance and a second resistor coupled between the first node and the second receive electrode and having the second resistance.

The resistor unit may include a first resistor coupled between the first receive electrode and the second receive electrode and having a resistance corresponding to a difference between the first resistance and the second resistance and a second resistor coupled between the first node and the second receive electrode and having the second resistance.

According to an exemplary embodiment a transceiver interface for a near-field communication (NFC) apparatus is provided. The transceiver interface includes a transmit and receive antenna, a transceiver, a transmission path coupled between a transmit electrode of the transceiver and the transmit and receive antenna, and a receiving path coupled between a receive electrode of the transceiver and the transmit and receive antenna. The transmission path is configured to transmit an outgoing signal to a radio frequency identification (RFID) tag while suppressing harmonics of the outgoing signal. The receiving path is configured to receive both an incoming signal from an RFID reader and an incoming signal from the RFID tag, and to provide to the receive electrode reduced levels of both the incoming signal from an RFID reader and the incoming signal from the RFID tag.

A voltage level of the incoming signal from the RFID tag may be greater than a voltage level of the incoming signal from the RFID reader.

The transmission path may include a filter circuit having at least one harmonic trap circuit configured to eliminate a harmonic element of a carrier frequency of the outgoing signal.

The at least one harmonic trap circuit comprises an inductor and a capacitor coupled in parallel with each other, the inductance of the inductor and the capacitance of the capacitor being matched such that harmonic trap circuit eliminates the harmonic element of the carrier frequency of the outgoing signal.

The transceiver interface may further include a direct current decoupling capacitor coupled between the transmit electrode and the harmonic trap circuit, and a filtering capacitor coupled between the transmit receive antenna and a ground voltage and configured to operate with the harmonic trap as a low pass filter to eliminate high frequency elements included in the outgoing signal.

The receiving path may include an attenuation circuit having a resistance circuit configured to reduce the incoming signal from the RFID tag by an amount of a first voltage and to reduce the incoming signal from the RFID reader by an amount of a second voltage, which is smaller than the first voltage.

BRIEF DESCRIPTION OF THE DRAWINGS

The exemplary embodiments will be more clearly understood from the following detailed description in conjunction with the accompanying drawings.

DETAILED DESCRIPTION

Figure 1:
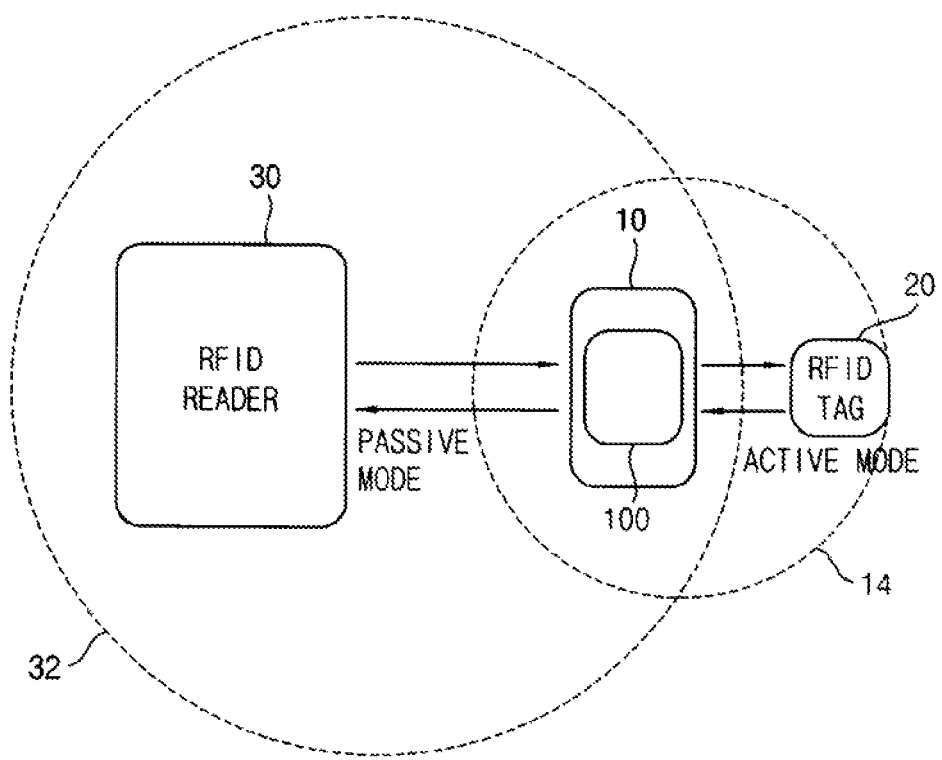
FIG. 1 is a block diagram illustrating a mobile apparatus including a wireless communication device according to an exemplary embodiment of the present inventive concept.

Various exemplary embodiments will be described more fully with reference to the accompanying drawings. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

FIG. 1 is a block diagram illustrating a mobile apparatus including a wireless communication device according to an exemplary embodiment.

Referring to FIG. 1, a mobile apparatus 10 includes a wireless communication device 100.

The mobile apparatus 10 may be a smart phone, a long term evolution (LTE) phone, or the like. The mobile apparatus 10 performs near-field communication (NFC) with a radio frequency identification (RFID) tag 20 and a RFID reader 30 using the wireless communication device 100.

The wireless communication device 100 includes a transceiver and an antenna. The antenna may be a loop antenna. In an exemplary embodiment the antenna may be formed on a battery cover of the mobile apparatus 10. In an exemplary embodiment, the antenna may be formed inside of a main body of the mobile apparatus 10.

In an active mode (that is, a reader mode), the mobile apparatus 10 may operate like a RFID reader. That is, the wireless communication device 100 emits a magnetic field 14 through its antenna to write data in the RFID tag 20 and read data from the RFID tag 20. In turn, the RFID tag 20 receiving the magnetic field 14 would transmit data to the wireless communication device 100 using power induced by the magnetic field 14. The wireless communication device 100 may receive the data, which is transmitted from the RFID tag 20, using the magnetic field 14.

The transceiver included in the wireless communication device 100 may include a class D amplifier or class E amplifier. In the active mode, for emitting the magnetic field 14 having a sufficient intensity through the antenna, the transceiver may generate an outgoing signal amplified to several watts using the class D amplifier or the class E amplifier and output the outgoing signal through the antenna. In this case, harmonic elements of a carrier frequency of the outgoing signal would be included in the outgoing signal. For example, if the carrier frequency of the outgoing signal is 13.56 MHz, harmonic elements, such as a second harmonic element having a frequency of 27.12 MHz, a third harmonic element having a frequency of 40.68 MHz, etc., would be included in the outgoing signal. If the harmonic elements are not filtered out from the outgoing signal before the outgoing signal is transmitted through the antenna, the harmonic elements may be treated as noise for the outgoing signal such that a communication performance may be degraded.

As will be described below with reference to FIG. 2, the wireless communication device 100 according to an exemplary embodiment includes a filter circuit in a transmission path that effectively filters out the harmonic elements. Therefore, communication performance of the wireless communication device 100 can increase.

In a passive mode (that is, a card mode), the mobile apparatus 10 may operate like a RFID tag. That is, if the mobile apparatus 10 enters in a magnetic field 32 emitted from the RFID reader 30, the wireless communication device 100 may receive data transmitted from the RFID reader 30 using power induced from the magnetic field 32.

As described above, in the active mode, the wireless communication device 100 may receive data using the magnetic field 14 generated by the wireless communication device 100. Therefore, voltage level of an incoming signal induced in a receive path of the wireless communication device 100 may be relatively high. On the other hand, in the passive mode, the wireless communication device 100 may receive data using the magnetic field 32 emitted from the RFID reader 30 as depicted in FIG. 1. Therefore, the voltage level of the incoming signal induced in the receive path of the wireless communication device 100 may be relatively low.

As will be described in more detail below with reference to FIG. 4, the wireless communication device 100 includes an attenuation circuit in the receive path that reduces the different voltage levels of the incoming signal in the active mode and in the passive mode to provide the transceiver with the incoming signal such that the wireless communication device 100 may receive data correctly both in the active mode and in the passive mode. As such, communication performance of the wireless communication device 100 can further increase.

Figure 2:
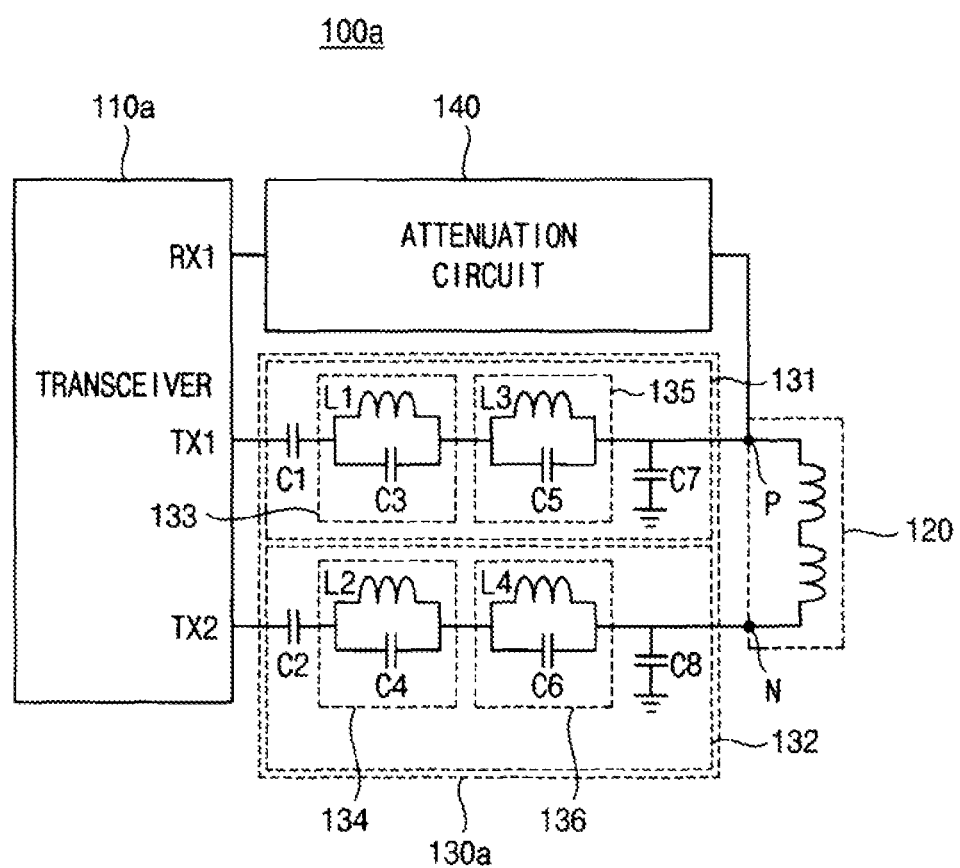
FIG. 2 is a block diagram illustrating an exemplary embodiment of the wireless communication device of FIG. 1.

FIG. 2 is a block diagram illustrating an exemplary embodiment of the wireless communication device of FIG. 1.

Referring to FIG. 2, the wireless communication device 100*a* includes a transceiver 110*a*, an antenna 120, a filter circuit 130*a* and an attenuation circuit 140.

The transceiver 110*a* communicates with an external device through the antenna 120. The transceiver 110*a* includes an amplifier that generates an outgoing signal which is to be output through the antenna 120. For example, the transceiver 110*a* may include a class D amplifier or a class E amplifier that generates the outgoing signal.

In an exemplary embodiment the amplifier may be a differential amplifier. In this case, the transceiver 110*a* may include a first transmission electrode TX1 and a second transmission electrode TX2 and output the outgoing signal through the first transmission electrode TX1 and the second transmission electrode TX2.

In an exemplary embodiment the amplifier may be a single-ended amplifier. In this case, the transceiver 110*a* may include one transmission electrode and output the outgoing signal through the one transmission electrode.

In FIG. 2, the depicted transceiver 110*a* includes a differential amplifier. Therefore, the transceiver 110*a* includes the first transmission electrode TX1 and the second transmission electrode TX2. Hereinafter, the wireless communication device 100*a* will be described wherein the transceiver 110*a* includes a differential amplifier. However, the exemplary embodiments of the present inventive concept are not limited thereto.

The antenna 120 has inductance. The antenna 120 may be a loop antenna having at least one turn. The antenna 120 together with capacitors included in the filter circuit 130*a* may determine a resonant frequency. The antenna 120 may generate an electrical signal in response to a magnetic field.

The filter circuit 130*a* is coupled between the first and the second transmission electrodes TX1, TX2 and a first and a second electrode P, N of the antenna 120. The first and the second transmission electrodes TX1, TX2 may be coupled to the first and the second electrodes P, N of the antenna 120, respectively, through the filter circuit 130*a*. The filter circuit 130*a* may be a transmission path of the wireless communication device 100*a*.

The filter circuit 130*a* includes at least one harmonic trap circuit 133, 134, 135, 136 that eliminates a harmonic element of a carrier frequency of the outgoing signal, which is provided from the transceiver 110*a* through the first and the second transmission electrodes TX1, TX2.

Each of the harmonic trap circuits 133, 134, 135, 136 may include an inductor and a capacitor coupled in parallel with each other. The inductance of the inductor and the capacitance of the capacitor may be matched such that the harmonic trap circuits 133, 134, 135, 136 eliminates a harmonic element of the carrier frequency of the outgoing signal.

The filter circuit 130*a* may include a positive filter circuit 131 and a negative filter circuit 132. The positive filter circuit 131 may be coupled between the first transmission electrodes TX1 and the first electrode P of the antenna 120. The negative filter circuit 132 may be coupled between the second transmission electrodes TX2 and the second electrode N of the antenna 120. Each of the positive filter circuit 131 and the negative filter circuit 132 may include at least one harmonic trap circuit 133, 134, 135, 136.

The positive filter circuit 131 may include a plurality of harmonic trap circuits 133, 135 coupled in series with each other, and each of the plurality of harmonic trap circuits 133, 135 may eliminate respective harmonic elements of the carrier frequency of the outgoing signal. In FIG. 2, the positive filter circuit 131 includes a first harmonic trap circuit 133 and a second harmonic trap circuit 135 coupled in series with each other. The first harmonic trap circuit 133 may include an inductor L1 and a capacitor C3 coupled in parallel with each other. The second harmonic trap circuit 135 may include an inductor L3 and a capacitor C5 coupled in parallel with each other. For example, when the carrier frequency is 13.56 MHz, the inductance of the inductor L1 and the capacitance of the capacitor C3 may be matched such that the first harmonic trap circuit 133 may eliminate a second harmonic element having a frequency of 27.12 MHz and the inductance of the inductor L3 and the capacitance of the capacitor C5 may be matched such that the second harmonic trap circuit 135 may eliminate a third harmonic element having a frequency of 40.68 MHz.

Similarly, the negative filter circuit 132 may include a plurality of harmonic trap circuits 134, 136 coupled in series with each other, and each of the plurality of harmonic trap circuits 134, 136 may eliminate respective harmonic element of the carrier frequency of the outgoing signal. In FIG. 2, the negative filter circuit 132 includes a third harmonic trap circuit 134 and a fourth harmonic trap circuit 136 coupled in series with each other. The third harmonic trap circuit 134 may include an inductor L2 and a capacitor C4 coupled in parallel with each other. The fourth harmonic trap circuit 136 may include an inductor L4 and a capacitor C6 coupled in parallel with each other. For example, when the carrier frequency is 13.56 MHz, the inductance of the inductor L2 and the capacitance of the capacitor C4 may be matched such that the third harmonic trap circuit 134 may eliminate the second harmonic element having a frequency of 27.12 MHz and the inductance of the inductor L4 and the capacitance of the capacitor C6 may be matched such that the fourth harmonic trap circuit 136 may eliminate the third harmonic element having a frequency of 40.68 MHz.

The filter circuit 130a may further include a direct current (DC) decoupling capacitor coupled between the first and the second transmission electrodes TX1, TX2 and the harmonic trap circuit. For example, the positive filter circuit 131 may further include a DC decoupling capacitor C1 coupled between the first transmission electrode TX1 and the first harmonic trap circuit 133, and the negative filter circuit 132 may further include a DC decoupling capacitor C2 coupled between the second transmission electrode TX2 and the third harmonic trap circuit 134. The DC decoupling capacitors C1, C2 may block a DC element of the outgoing signal.

The filter circuit 130a may further include a filtering capacitor coupled between a node at which the harmonic trap circuit and the antenna 120 are coupled and a ground voltage. For example, the positive filter circuit 131 may further include a filtering capacitor C7 coupled between a first node at which the second harmonic trap circuit 135 and the first electrode P of the antenna 120 are coupled and the ground voltage, and the negative filter circuit 132 may further include a filtering capacitor C8 coupled between a second node at which the fourth harmonic trap circuit 136 and the second electrode N of the antenna 120 are coupled and the ground voltage. The filtering capacitor C7 together with the inductors L1, L3 included in the harmonic trap circuits 133, 135 may operate as a low pass filter to eliminate high frequency elements included in the outgoing signal. The filtering capacitor C8 together with the inductors L2, L4 included in the harmonic trap circuits 134, 136 may operate as a low pass filter to eliminate high frequency elements included in the outgoing signal.

The transceiver 110a includes a receive electrode RX1. The attenuation circuit 140 is coupled between the receive electrode RX1 and the antenna 120. The attenuation circuit 140 may be a receive path of the wireless communication device 100a. The attenuation circuit 140 provides an incoming signal received through the antenna 120 to the receive electrode RX1 after reducing a voltage of the incoming signal. Exemplary embodiments of the attenuation circuit 140 are described in more detail below.

As described above, the filter circuit 130a may block a DC element of the outgoing signal using the DC decoupling capacitors C1, C2, eliminate harmonic elements of the carrier frequency of the outgoing signal using the harmonic trap circuits 133, 134, 135, 136, and eliminate high frequency elements included in the outgoing signal using the filtering capacitors C7, C8. Therefore, the wireless communication device 100a effectively reduces noise included in the outgoing signal such that the wireless communication device 100a can increase communication performance.

The wireless communication device 100a has been described above in the case that the transceiver 110a includes a differential amplifier. However, the transceiver 110a may include a single-ended amplifier. In this case, only one of the positive filter circuit 131 and the negative filter circuit 132 may be coupled between the one transmission electrode and the antenna 120.

Figure 3A:
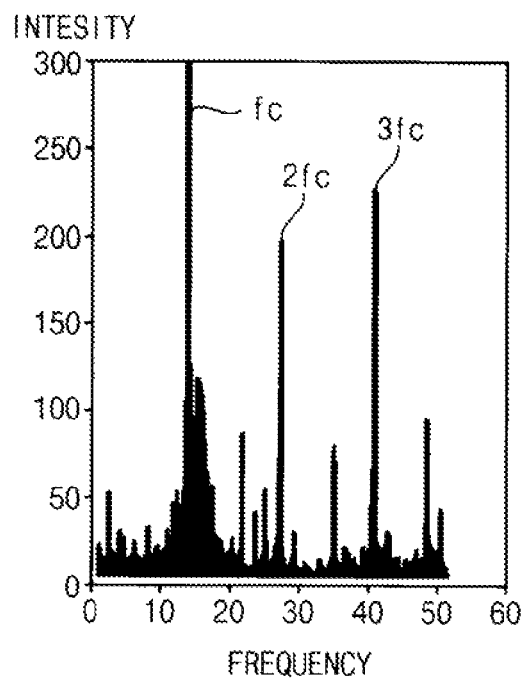
FIGS. 3A and 3B are graphs for depicting the reduction of harmonic elements in the wireless communication device of FIG. 1.
Figure 3B:
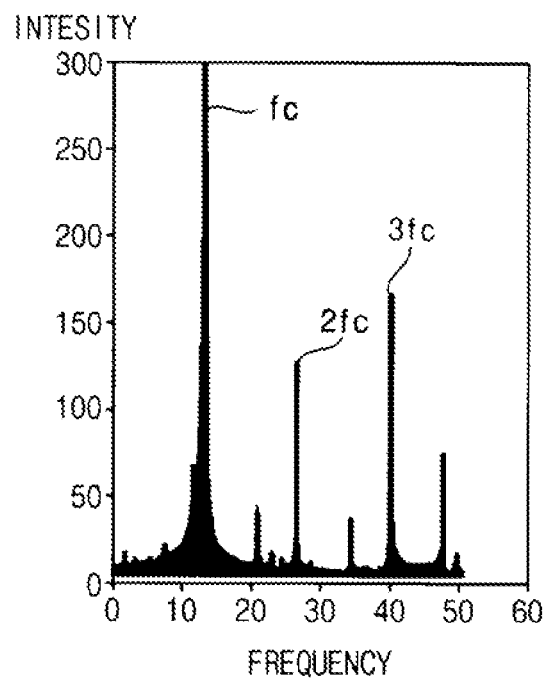

FIGS. 3A and 3B are graphs for depicting the reduction of harmonic elements in the wireless communication device of FIG. 1.

FIG. 3A represents the frequency spectrum of an outgoing signal transmitted from a conventional wireless communication device, while FIG. 3B represents a frequency spectrum of an outgoing signal transmitted from the wireless communication device 100a of FIG. 2.

In FIGS. 3A and 3B, fc represents a carrier frequency, 2fc represents a second harmonic frequency, and 3fc represents a third harmonic frequency.

When comparing the graphs of FIGS. 3A and 3B, the intensities of the second harmonic element having a frequency of 2fc and the third harmonic element having a frequency of 3fc in FIG. 3B are reduced by more than 10 dB as compared to those in FIG. 3A. In addition, high frequency elements also reduced in FIG. 3B as compared to those in FIG. 3A.

Figure 4:
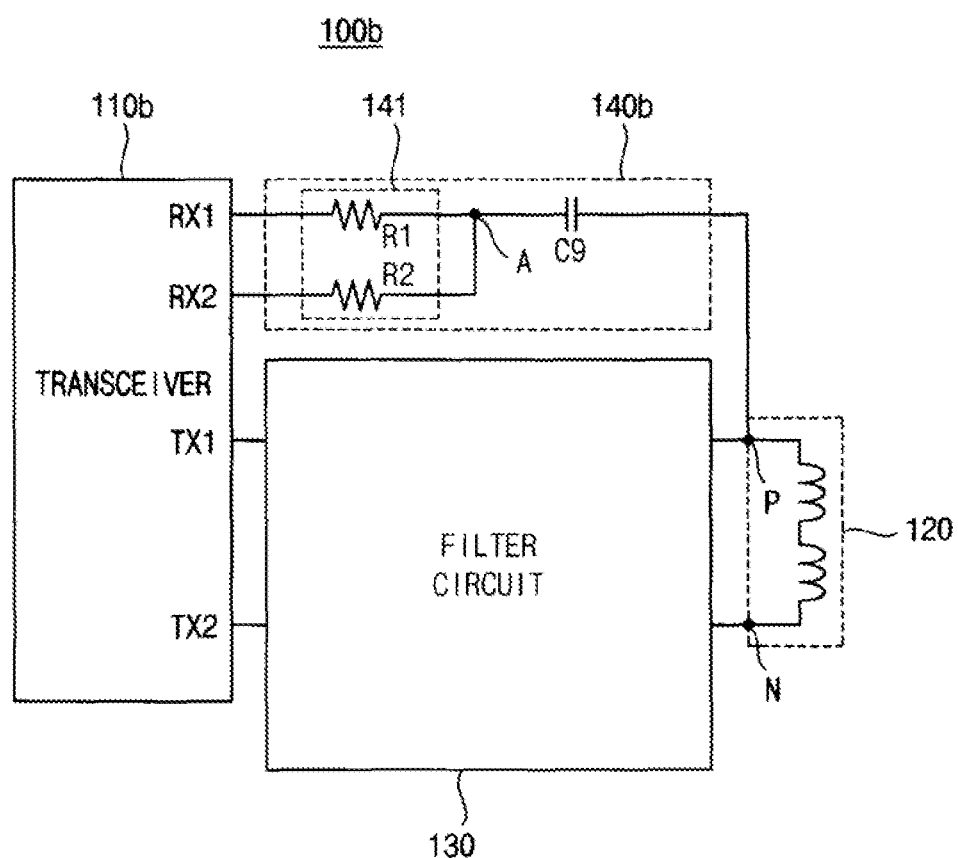
FIGS. 4, 5 and 6 are block diagrams illustrating exemplary embodiments of the wireless communication device of FIG. 1.
Figure 5:
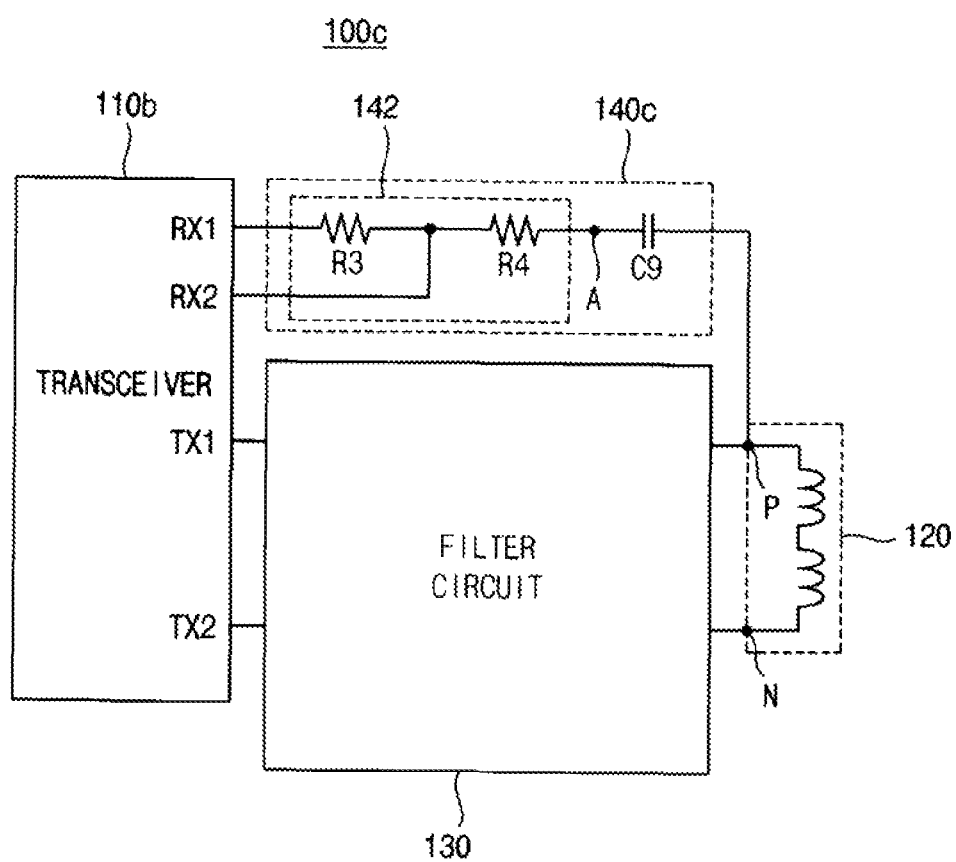

FIGS. 4 and 5 are block diagrams illustrating exemplary embodiments of the wireless communication device of FIG. 1.

Referring to FIGS. 4 and 5, the wireless communication devices 100b, 100c may include a transceiver 110b, an antenna 120, a filter circuit 130 and respective attenuation circuits 140b, 140c.

The only difference between the wireless communication device 100b of FIG. 4 and the wireless communication device 100c of FIG. 5 is that the attenuation circuit 140b of FIG. 4 includes a resistor unit 141 and the attenuation circuit 140c of FIG. 5 includes a resistor unit 142.

The transceiver 110b communicates with an external device through the antenna 120. The transceiver 110b may include an amplifier that generates an outgoing signal which is to be output through the antenna 120. The amplifier may be a differential amplifier. The transceiver 110b may include a first transmission electrode TX1 and a second transmission electrode TX2, and may output the outgoing signal through the first transmission electrode TX1 and the second transmission electrode TX2.

The filter circuit 130 is coupled between the first and the second transmission electrodes TX1, TX2 and the antenna 120. The filter circuit 130 may be a transmission path of the wireless communication device 100b. The filter circuit 130 filters the outgoing signal provided from the transceiver 110b through the first and the second transmission electrodes TX1, TX2 and provides the filtered outgoing signal to the antenna 120. The filter circuit 130 may be embodied with various designs.

The antenna 120 has inductance. The antenna 120 may be a loop antenna having at least one turn. The antenna 120 may generate an electrical signal in response to a magnetic field.

The transceiver 110b includes a first receive electrode RX1 and a second receive electrode RX2. The attenuation circuit 140b is coupled between the first and the second receive electrodes RX1, RX2 and the antenna 120. For example, the attenuation circuit 140b may be connected to one of a first and a second electrodes P, N of the antenna 120. The attenuation circuits 140b, 140c may be a receive paths of the wireless communication devices 100b, 100c.

In the active mode, the attenuation circuits 140b, 140c provide an incoming signal received through the antenna 120 to the first receive electrode RX1 after reducing a voltage of the incoming signal by an amount of a first voltage. In the passive mode, the attenuation circuits 140b, 140c provide the incoming signal to the second receive electrode RX2 after reducing the voltage of the incoming signal by an amount of a second voltage, which is smaller than the first voltage. Therefore, the attenuation circuits 140b, 140c may provide a separate receive path in the active mode and in the passive mode.

As described above with reference to FIG. 1, in the active mode, the wireless communication devices 100b, 100c may receive data using the magnetic field 14 generated by the wireless communication devices 100b, 100c. Therefore, voltage level of the incoming signal induced by the antenna 120 may be relatively high. On the other hand, in the passive mode, the wireless communication devices 100b, 100c may receive data using the magnetic field 32 emitted from an external device, that is, the RFID reader 30. Therefore, voltage level of the incoming signal induced by the antenna 120 may be relatively low.

The attenuation circuits 140b, 140c may provide a first resistance between the antenna 120 and the first receive electrode RX1 and may provide a second resistance, which is smaller than the first resistance, between the antenna 120 and the second receive electrode RX2 to provide the transceiver 110b with the incoming signal within the operational range of the transceiver 110b, both in the active mode and in the passive mode.

For example, as illustrated in FIGS. 4 and 5, the attenuation circuit 140b may include resistor unit 141 and a capacitor C9, while, alternatively, the attenuation circuit 140c may include resistor unit 142 and capacitor C9. The resistor units 141, 142 may provide the first resistance between a first node A and the first receive electrode RX1 and provide the second resistance between the first node A and the second receive electrode RX2. The capacitor C9 may be coupled between the first node A and the antenna 120. The capacitor C9 may block a DC element of the incoming signal. In addition, the capacitor C9 may adjust a phase of the incoming signal to enhance a demodulation quality of the incoming signal.

In the exemplary embodiment illustrated in FIG. 4, the resistor unit 141 may include a first resistor R1 and the second resistor R2. The first resistor R1 may be coupled between the first node A and the first receive electrode RX1 and have the first resistance. The second resistor R2 may be coupled between the first node A and the second receive electrode RX2 and have the second resistance.

In the exemplary embodiments illustrated in FIG. 5, the resistor unit 142 may include a third resistor R3 and the fourth resistor R4. The third resistor R3 may be coupled between the first receive electrode RX1 and the second receive electrode RX2 and have a resistance corresponding to a difference between the first resistance and the second resistance. The fourth resistor R4 may be coupled between the first node A and the second receive electrode RX2 and have the second resistance.

As described above, the attenuation circuits 140b, 140c included in the wireless communication devices 100b, 100c, respectively, may reduce voltage levels of the different incoming signals of the active mode and the passive mode such that the wireless communication devices 100b, 100c may receive data correctly both in the active mode and in the passive mode. As such, communication performance of the wireless communication devices 100b, 100c can increase.

Figure 6:
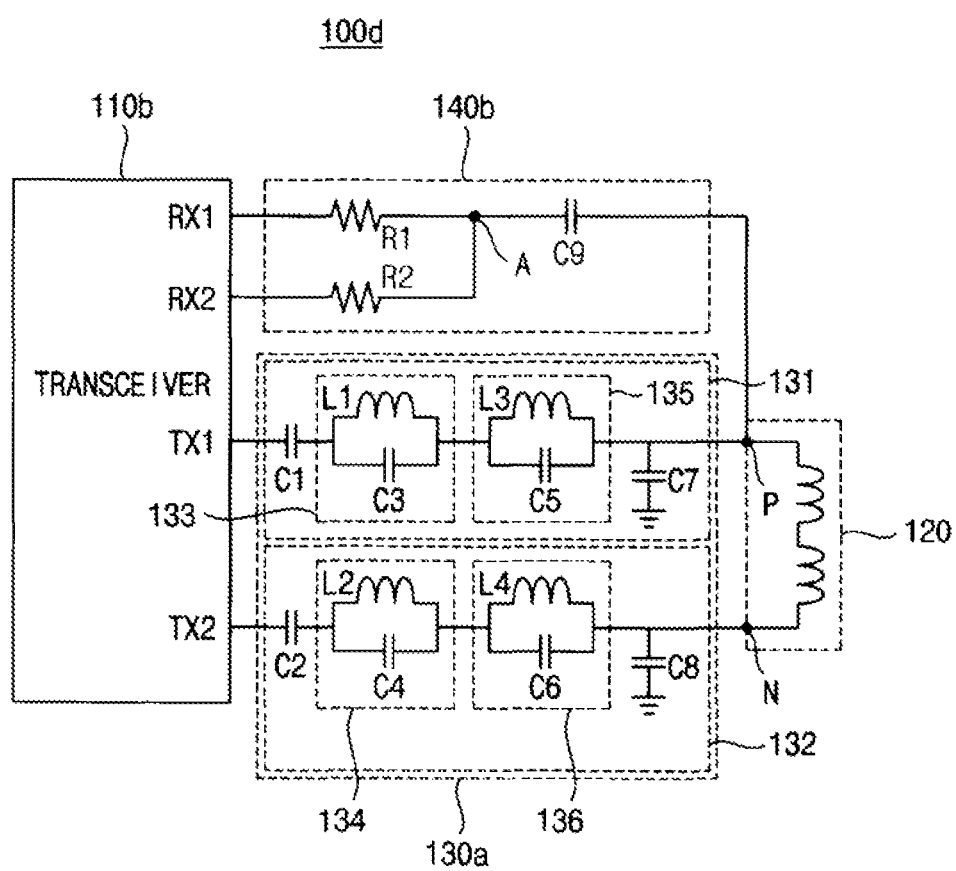

FIG. 6 is a block diagram further illustrating an exemplary embodiment of the wireless communication device of FIG. 1.

Referring to FIG. 6, the wireless communication device 100d includes a transceiver 110b, an antenna 120, a filter circuit 130a and an attenuation circuit 140b.

The transceiver 110b and the attenuation circuit 140b of FIG. 6 may be implemented with the transceiver 110b and the attenuation circuit 140b of FIG. 4. The filter circuit 130a of FIG. 6 may be implemented by the filter circuit 130a of FIG. 2. The structure and operation of the transceiver 110b, the filter circuit 130a and the attenuation circuit 140b have been described above with reference to FIGS. 2, 3 and 4, and, therefore, a more detailed description of the wireless communication device 100d will be omitted here.

Since the wireless communication device 100d includes both the filter circuit 130a and the attenuation circuit 140b, the wireless communication device 100d can effectively reduce noise included in the outgoing signal while receiving data correctly both in the active mode and in the passive mode. As such, the wireless communication device 100d can have increased communication performance.

The foregoing is illustrative of exemplary embodiments of the present inventive concept and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such exemplary embodiments, modifications thereto, as well as other exemplary embodiments, are intended to be included within the scope of the present inventive concept as defined in the accompanying claims.

What is claimed is:

1. A wireless communication device, comprising:
an antenna having inductance;
a transceiver comprising a transmission electrode and a receive electrode, the transceiver configured to communicate with an external device through the antenna;
a filter circuit coupled between the transmission electrode and the antenna, the filter circuit comprising a harmonic trap circuit configured to eliminate a harmonic element of a carrier frequency of an outgoing signal provided from the transceiver through the transmission electrode; and
an attenuation circuit coupled between the receive electrode and the antenna, the attenuation circuit configured to provide an incoming signal received through the antenna to the receive electrode after reducing a voltage of the incoming signal,
wherein harmonic element elimination and incoming signal voltage reduction is provided without mode selection switching between an active reader mode and a passive card mode.

2. The wireless communication device of claim 1, wherein the harmonic trap circuit comprises an inductor and a capacitor coupled in parallel with each other.

3. The wireless communication device of claim 1, wherein the filter circuit comprises a plurality of harmonic trap circuits coupled in series with each other, each of the plurality of harmonic trap circuits configured to eliminate respective harmonic elements of the carrier frequency of the outgoing signal.

4. A wireless communication device, comprising:
an antenna having inductance;

a transceiver comprising a transmission electrode and a receive electrode, the transceiver configured to communicate with an external device through the antenna;
a filter circuit coupled between the transmission electrode and the antenna, the filter circuit comprising a harmonic trap circuit configured to eliminate a harmonic element of a carrier frequency of an outgoing signal provided from the transceiver through the transmission electrode; and
an attenuation circuit coupled between the receive electrode and the antenna, the attenuation circuit configured to provide an incoming signal received through the antenna to the receive electrode after reducing a voltage of the incoming signal,
wherein the filter circuit further comprises a first capacitor coupled between the transmission electrode and the harmonic trap circuit.

5. The wireless communication device of claim 4, wherein the filter circuit further comprises a second capacitor coupled between a node at which the harmonic trap circuit and the antenna are coupled and a ground voltage.

6. The wireless communication device of claim 1, wherein the transceiver comprises a class D amplifier or a class E amplifier configured to generate the outgoing signal.

7. The wireless communication device of claim 1,
wherein the carrier frequency is 13.56 MHz, and
wherein the filter circuit comprises a first harmonic trap circuit and a second harmonic trap circuit coupled in series with the first harmonic trap circuit, the first harmonic trap circuit configured to eliminate a second harmonic element having a frequency of 27.12 MHz, and the second harmonic trap circuit configured to eliminate a third harmonic element having a frequency of 40.68 MHz.

8. A wireless communication device, comprising;
an antenna having a inductance;
a transceiver comprising a transmission electrode and a receive electrode, the transceiver configured to communicate with an external device through the antenna;
a filter circuit coupled between the transmission electrode and the antenna, the filter circuit comprising a harmonic trap circuit configured to eliminate a harmonic element of a carrier frequency of an outgoing signal provided from the transceiver through the transmission electrode; and
an attenuation circuit coupled between the receive electrode and the antenna, the attenuation circuit configured to provide an incoming signal received through the antenna to the receive electrode after reducing a voltage of the incoming signal,
wherein the transceiver comprises a differential amplifier configured to generate the outgoing signal and to output the outgoing signal through a first transmission electrode and a second transmission electrode, and
wherein the filter circuit comprises:
a positive filter circuit coupled between the first transmission electrode and a first electrode of the antenna, the positive filter circuit comprising a first harmonic trap circuit that eliminates the harmonic element; and
a negative filter circuit coupled between the second transmission electrode and a second electrode of the antenna, the negative filter circuit comprising a second harmonic trap circuit that eliminates the harmonic element.

9. The wireless communication device of claim 8,
wherein the positive filter circuit further comprises:
a first capacitor coupled between the first transmission electrode and the first harmonic trap circuit; and
a second capacitor coupled between a first node, at which the first harmonic trap circuit and the first electrode of the antenna are coupled, and a ground voltage, and
wherein the negative filter circuit further comprises:
a third capacitor coupled between the second transmission electrode and the second harmonic trap circuit; and
a fourth capacitor coupled between a second node, at which the second harmonic trap circuit and the second electrode of the antenna are coupled, and the ground voltage.

10. A wireless communication device, comprising:
an antenna having inductance;
a transceiver comprising a transmission electrode, a first receive electrode and a second receive electrode, the transceiver configured to communicate with an external device through the antenna;
a filter circuit coupled between the transmission electrode and the antenna, the filter circuit configured to filter an outgoing signal provided from the transceiver through the transmission electrode and to provide the filtered outgoing signal to the antenna; and
an attenuation circuit coupled between the first receive electrode, the second receive electrode and the antenna, the attenuation circuit configured to provide an incoming signal received through the antenna to the first receive electrode after reducing a voltage of the incoming signal by an amount of a first voltage in an active mode and to provide the incoming signal to the second receive electrode after reducing the voltage of the incoming signal by an amount of a second voltage, which is smaller than the first voltage, in a passive mode.

11. The wireless communication device of claim 10, wherein the attenuation circuit comprises:
a first resistance between the antenna and the first receive electrode, and
a second resistance, smaller than the first resistance, between the antenna and the second receive electrode.

12. The wireless communication device of claim 10, wherein the attenuation circuit comprises:
a resistor unit comprising:
a first resistance between a first node and the first receive electrode; and
a second resistance, smaller than the first resistance, between the first node and the second receive electrode; and
a capacitor coupled between the first node and the antenna.

13. The wireless communication device of claim 12, wherein the resistor unit comprises:
a first resistor coupled between the first node and the first receive electrode, the first resistor having the first resistance; and
a second resistor coupled between the first node and the second receive electrode, the second resistor having the second resistance.

14. The wireless communication device of claim 12, wherein the resistor unit comprises:
a first resistor coupled between the first receive electrode and the second receive electrode, the first resistor having a resistance corresponding to a difference between the first resistance and the second resistance; and
a second resistor coupled between the first node and the second receive electrode, the second resistor having the second resistance.

15. A transceiver interface for a near-field communication (NFC) apparatus, the transceiver interface comprising:
- a transmit and receive antenna;
- a transceiver;
- a transmission path coupled between a transmit electrode of the transceiver and the transmit and receive antenna; and
- a receiving path coupled between a receive electrode of the transceiver and the transmit and receive antenna,
- wherein the transmission path is configured to transmit an outgoing signal to a radio frequency identification (RFID) tag while suppressing harmonics of the outgoing signal; and
- wherein the receiving path is configured to receive both an incoming signal from an RFID reader and an incoming signal from the RFID tag, and to provide the receive electrode with reduced levels of both the incoming signal from an RFID reader and the incoming signal from the RFID tag,
- wherein the harmonic suppression of the outgoing signal and the level reduction of the incoming signal are provided without mode selection switching between an RFID reader mode and an RFID tag mode.

16. A transceiver interface for a near field communication NFC) apparatus, the transceiver interface comprising:
- a transmit and receive antennas;
- a transceiver;
- a transmission path coupled between a transmit electrode of the transceiver and the transmit and receive antenna; and
- a receiving path coupled between a receive electrode of the transceiver and the transmit and receive antenna,
- wherein the transmission path is configured to transmit an outgoing signal to a radio frequency identification (RFID) tag while suppressing harmonics of the outgoing signal; wherein the receiving path is configured to receive both an incoming signal from an RFID reader and an incoming signal from the RFID tag, and to provide the receive electrode with reduced levels of both the incoming signal from an RFID reader and the incoming signal from the RFID tag, and
- wherein a voltage level of the incoming signal from the RFID tag is greater than a voltage level of the incoming signal from the RFID reader.

17. The transceiver interface of claim 15, wherein the transmission path comprises a filter circuit having at least one harmonic trap circuit configured to eliminate a harmonic element of a carrier frequency of the outgoing signal.

18. The transceiver interface of claim 17, wherein the at least one harmonic trap circuit comprises an inductor and a capacitor coupled in parallel with each other, the inductance of the inductor and the capacitance of the capacitor being matched such that harmonic trap circuit eliminates the harmonic element of the carrier frequency of the outgoing signal.

19. The transceiver interface of claim 17, further comprising:
- a direct current decoupling capacitor coupled between the transmit electrode and the harmonic trap circuit; and
- a filtering capacitor coupled between the transmit receive antenna and a ground voltage and configured to operate with the harmonic trap as a low pass filter to eliminate high frequency elements included in the outgoing signal.

20. A transceiver interface for a near-field communication (NFC) apparatus, the transceiver interface comprising:
- a transmit and receive antenna;
- a transceiver;
- a transmission path coupled between a transmit electrode of the transceiver and the transmit and receive antenna; and
- a receiving coupled between a receive electrode of the transceiver and the transmit and receive antenna,
- wherein the transmission path is configured to transmit an outgoing signal to a radio frequency identification (RFID) tag while suppressing harmonics of the outgoing signal; wherein the receiving path is configured to receive both an incoming signal from an RFID reader and an incoming signal from the RFID tag, and to provide the receive electrode with reduced levels of both the incoming signal from an RFID reader and the incoming signal from the RFID tag, and
- wherein the receiving path comprises an attenuation circuit having a resistance circuit configured to reduce the incoming signal from the RFID tag by an amount of a first voltage and to reduce the incoming signal from the RFID reader by an amount of a second voltage, which is smaller than the first voltage.

* * * * *